(12) United States Patent
Yue et al.

(10) Patent No.: US 10,106,721 B2
(45) Date of Patent: Oct. 23, 2018

(54) CATIONIC SURFACTANTS FOR SCALE INHIBITOR SQUEEZE APPLICATIONS

(71) Applicant: Multi-Chem Group, LLC, San Angelo, TX (US)

(72) Inventors: Zhiwei Yue, Sugar Land, TX (US); Funian Zhao, Tomball, TX (US); Yang Peng, Kingwood, TX (US); Liangwei Qu, Spring, TX (US); Chunfang Fan, Houston, TX (US)

(73) Assignee: Multi-Chem Group, LLC, San Angelo, TX (US)

( * ) Notice: Subject to any disclaimer, the term of this patent is extended or adjusted under 35 U.S.C. 154(b) by 0 days.

(21) Appl. No.: 15/527,070

(22) PCT Filed: Dec. 22, 2014

(86) PCT No.: PCT/US2014/071866
§ 371 (c)(1),
(2) Date: May 16, 2017

(87) PCT Pub. No.: WO2016/105339
PCT Pub. Date: Jun. 30, 2016

(65) Prior Publication Data
US 2017/0342309 A1    Nov. 30, 2017

(51) Int. Cl.
*E21B 43/22*     (2006.01)
*C09K 8/528*     (2006.01)
(Continued)

(52) U.S. Cl.
CPC .............. *C09K 8/528* (2013.01); *C09K 8/035* (2013.01); *C09K 8/584* (2013.01); *E21B 37/06* (2013.01)

(58) Field of Classification Search
CPC .......... C09K 8/56; C09K 8/805; C09K 8/035; C09K 8/62; C09K 8/5753; E21B 43/267;
(Continued)

(56) References Cited

U.S. PATENT DOCUMENTS 8,003,575 B2   8/2011  De Campo et al.
2004/0154799 A1  8/2004  Powell et al.
(Continued)

FOREIGN PATENT DOCUMENTS

WO    2004/011772 A1    2/2004
WO    2013182852 A1    12/2013

OTHER PUBLICATIONS

Sitz, Curtis, et al. "A New Class of Non-Damaging, Environmentally Responsible Scale Squeeze Enhancement Aids." SPE International Conference on Oilfield Scale. Society of Petroleum Engineers, 2012.
(Continued)

*Primary Examiner* — Zakiya W Bates
(74) *Attorney, Agent, or Firm* — Tenley Krueger; Baker Botts L.L.P.

(57) ABSTRACT

Methods, compositions, and systems for scale inhibitor squeeze treatments using certain cationic surfactants are provided. In one embodiment, the methods comprise: introducing a pre-flush fluid into at least a portion of a subterranean formation, the pre-flush fluid comprising a cationic surfactant comprising two or more hydrophilic heads, at least one lipophilic tail, and one or more linking groups to which the hydrophilic heads and the lipophilic tail are bonded; and introducing a treatment fluid comprising anionic scale inhibitor into the portion of the subterranean formation after at least a portion of the pre-flush fluid has been introduced into the portion of the subterranean formation.

20 Claims, 6 Drawing Sheets

(51) Int. Cl.
*C09K 8/035* (2006.01)
*C09K 8/584* (2006.01)
*E21B 37/06* (2006.01)

(58) Field of Classification Search
CPC ........ E21B 33/138; E21B 43/16; E21B 43/26; E21B 43/261
See application file for complete search history.

(56) References Cited

U.S. PATENT DOCUMENTS

| | | |
|---|---|---|
| 2007/0267193 A1 | 11/2007 | Hills et al. |
| 2008/0257551 A1 | 10/2008 | Morris |
| 2009/0036637 A1 | 2/2009 | Otter et al. |
| 2009/0325826 A1 | 12/2009 | Quintero et al. |
| 2010/0285999 A1 | 11/2010 | Norman et al. |
| 2014/0155299 A1 | 6/2014 | Hardy et al. |

OTHER PUBLICATIONS

Ghosh, Bisweswar, and Xin Li. "Effect of surfactant composition on reservoir wettability and scale inhibitor squeeze ifetime in oil wet carbonate reservoir." Journal of Petroleum Science and Engineering 108 (2013): 250-258.

Li, Xin. Enhancing scale inhibitor squeeze lifecycle in a carbonate reservoir. Diss. The Petroleum Institute (United Arab Emirates), 2011.

International Search Report and Written Opinion issued in related PCT Application No. PCT/US2014/071866 dated Jul. 28, 2015, 12 pages.

International Preliminary Report on Patentability issued in related Application No. PCT/US2014/071866, dated Jul. 6, 2017 (9 pages).

Office Action issued in related AU Application No. 2014414853, dated Aug. 2, 2017 (5 pages).

CATIONIC SURFACTANTS FOR SCALE INHIBITOR SQUEEZE APPLICATIONS

CROSS-REFERENCE TO RELATED APPLICATION

The present application is a U.S. National Stage Application of International Application No. PCT/US2014/071866 filed Dec. 22, 2014, which is incorporated herein by reference in its entirety for all purposes.

BACKGROUND

The present disclosure relates to methods, compositions, and systems for treating subterranean formations to reduce the formation of scales therein.

Oilfield fluids (e.g., oil, gas, and water) are generally complex mixtures of aliphatic hydrocarbons, aromatics, hetero-atomic molecules, anionic and cationic salts, acids, sands, silts, clays and a vast array of other components. The nature of these fluids combined with sometimes severe conditions of heat, pressure, and turbulence to which they are often subjected during retrieval, are contributory factors to scale formation in oil and/or gas production wells and surface equipment. Wherever water production occurs, the potential for some type of scale formation exists. "Scale," as the term is used herein, may refer to any mineral or solid salt deposit that forms in a formation, for example, when the saturation of formation water to one or more minerals is affected by changing physical conditions (such as temperature, pressure, or composition), thus causing minerals and salts previously in solution to precipitate into solids. Scale deposits may comprise a variety of materials, including but not limited to calcium carbonate, magnesium carbonate, calcium sulfate, magnesium sulfate, barium sulfate, strontium sulfate, iron sulfides, and the like. Scale deposits can form on any surface in a down hole operation, including subterranean formations, production tubing, gravel packing screens, and other well bore equipment. Scale can develop almost immediately, or build up over several months before becoming noticeable. The effect scale has on productivity depends on the type, location, and the mass deposited. Scale formation can become so severe as to restrict or even completely choke production. The formation of scale can decrease permeability of the subterranean formation, reduce well productivity and shorten the lifetime of production equipment. In order to clean scale from wells and equipment it is generally necessary to stop production, which is both time-consuming and costly.

The formation of scale is often controlled by the use of chemical scale inhibitors that reduce or prevent the precipitation and/or deposit of these scales in the formation. Several methods are known in the art for introducing scale inhibitors into production wells. For example, a solid form of a scale inhibitor may be placed into the formation; however, this method may be limited due to the fact that there are relatively few effective solid scale inhibitors and each has functional or design limitations. Another known method of placing scale inhibitor is a "squeeze" application in which a scale inhibitor is introduced into a formation and adsorbed or precipitates onto the reservoir rock surfaces and helps prevent or diminish scale deposition. However, in conventional applications of these methods, it may be difficult or impossible to confirm whether the scale inhibitor has been adsorbed onto the rock surface with sufficient mechanical strength to avoid displacement by fluids flowing through the formation, and in an adequate amount to provide effective scale inhibition. In some cases, it may be difficult and/or require long periods of shut-in time to allow the scale inhibitor to adequately adsorb onto rock surfaces downhole.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods, compositions, and systems for treating subterranean formations to reduce the formation of scales therein. More particularly, the present disclosure relates to methods, compositions, and systems for scale inhibitor squeeze treatments using certain cationic surfactants.

The present disclosure provides methods, compositions, and systems for applying and/or enhancing scale inhibitor squeeze treatments in subterranean formations by treating a portion of the formation with a pre-flush fluid that comprises one or more of certain cationic surfactants. The cationic surfactants used in the methods and systems of the present disclosure generally comprise multiple (i.e., two or more) hydrophilic heads, at least one lipophilic tail, and one or more linking groups. In the methods of the present disclosure, a pre-flush fluid comprising one or more of these cationic surfactants is introduced into at least a portion of a subterranean formation, after which a treatment fluid comprising an anionic scale inhibitor is also introduced into that portion of a subterranean formation. In certain embodiments, the fluids are introduced (e.g., injected or pumped) into the formation via a well bore penetrating the subterranean formation, and are introduced at a pressure sufficient to push the fluids into at least the near well bore area of a portion of the subterranean formation (although typically below the pressure that will create or enhance fractures in the formation). Without limiting the disclosure to any particular theory or mechanism, it is believed that the cationic surfactants of the present disclosure may bind to anionic scale inhibitors to form larger macromolecules. These macromolecules may form polymeric micro-precipitations in brines under certain conditions (e.g., higher pH levels), and slowly dissociate back to inhibitor molecules when the conditions or environment changes. When the cationic surfactants are applied to a formation in a pre-flush treatment, it is believed that they may facilitate the adsorption of the anionic scale inhibitor introduced in a subsequent treatment onto rock surfaces in the formation.

Among the many potential advantages to the methods and compositions of the present disclosure, only some of which are alluded to herein, the methods, compositions, and systems of the present disclosure may allow for more effective application of scale inhibitor squeeze treatments in a number of ways. For example, in certain embodiments, the methods and systems of the present disclosure may reduce the shut-in time needed to allow for effective adsorption and/or precipitation of the scale inhibitor in the formation. In certain embodiments, the methods and systems of the present disclosure may permit the scale inhibitor to more strongly bond and/or adhere to rock surfaces within a formation, and may increase the amount of time during which a scale inhibitor squeeze treatment may remain effective. The precipitation and/or adsorption of the scale inhibitor may at least partially depend on pH (e.g., generally tending to occur at higher pH conditions), and thus may be easily reduced or removed from the formation by altering the pH conditions downhole (e.g., flushing a weak acid solution into the formation). The methods and systems of the present disclosure may be able to place scale inhibitor squeeze treatments without the use of concentrated brines, which sometimes cause formation damage. These and other benefits may facilitate the use of certain types of scale inhibitors (e.g., polymeric scale inhibitors) that are more environmentally-friendly but often impractical or unsuitable for use in certain types of formations.

Cationic Surfactants

One or more of the multiple hydrophilic heads in the cationic surfactants of the present disclosure may each comprise a cation moiety. Any one or more of the multiple heads may each comprise a quaternary cation moiety (e.g., a quaternary ammonium or quaternary phosphonium cation moiety). In particular embodiments, each of two or more of the multiple heads may comprise a quaternary cation moiety, such that the compound comprises two or more quaternary cation moieties. A quaternary cation moiety may be referred to herein as a "quat moiety" or alternatively as a "quat." A compound comprising two or more quats may be referred to herein alternatively as a "multiple quat," a "multi-quat," or a "multiple quaternary compound."

A quat moiety located on an end-point of a compound according to some embodiments may be of the general structure $R^1R^2R^3M^+$—, where each R-group $R^1$, $R^2$, and $R^3$ may be any suitable moiety that maintains the hydrophilic nature of the quat moiety to which each of $R^1$, $R^2$, and $R^3$ is attached, and M may be nitrogen or phosphorus. In various embodiments, each R-group may be either the same or different with respect to the others. In some embodiments, each of $R^1$ and $R^2$ (and $R^3$, where present) may comprise an organic moiety such as any one or more of: alkyl, alkenyl, alkynyl, aryl, arylalkyl, arylalkenyl, alkylaryl, alkenylaryl, glycol, and combinations thereof. Each of $R^1$, $R^2$, and $R^3$ may be branched or linear (unbranched). Each of $R^1$, $R^2$, and $R^3$ may be different, although any two or more of these R groups may be the same. Each of these R-groups may comprise approximately 1 to 20 carbon atoms. That is, each R-group may be a $C_1$ to $C_{20}$ hydrocarbon chain (excepting embodiments wherein the R-group comprises an alkenyl or alkynyl group, in which case at least 2 carbon atoms are necessary). In particular embodiments, each R-group may be a $C_1$ to $C_{12}$ hydrocarbon chain. As used herein, a "hydrocarbon chain" may, unless otherwise specifically noted, be substituted or unsubstituted (that is, it may or may not contain one or more additional moieties or functional groups in place of one or more hydrogens in the hydrocarbon chain); it may be branched, unbranched, acyclic, and/or cyclic; and/or it may be saturated or unsaturated. Furthermore, as used herein, the nomenclature "$C_x$ to $C_y$," refers to the number of carbon atoms in the hydrocarbon chain (here, ranging from x to y carbon atoms).

An R-group hydrocarbon chain according to various embodiments may be either substituted or unsubstituted, and/or branched or unbranched, and/or cyclic or non-cyclic, and/or saturated or unsaturated. Thus, an R-group of some embodiments may comprise a $C_1$ to $C_{10}$ alkyl chain (branched or unbranched), or in other embodiments a $C_2$ to $C_6$ alkyl, alkenyl, or alkynyl chain (branched or unbranched), or in yet other embodiments a $C_2$ to $C_8$ alkyl, alkenyl, or alkynyl chain (branched or unbranched). Similarly, an R-group may comprise a $C_3$ to $C_{10}$ aryl moiety (and likewise for $C_3$ to $C_6$ moieties). Some embodiments may include R-groups of variously sized hydrocarbon chains, such as a hydrocarbon chain having as few as any one of: 1, 2, 3, 4, 5, 6, 7, 8, 9, and 10 carbon atoms; and as many as any one of: 2, 3, 4, 5, 6, 7, 8, 9, 10, 11, 12, 13, 14, 15, 16, 17, 18, 19, and 20 carbon atoms. As noted, an R-group according to some embodiments may include other groups in addition to the hydrocarbon groups described above (e.g., it may include a substituted hydrocarbon chain), so long as the quat moiety remains hydrophilic. An R-group of any quat moiety of a compound according to some embodiments may be smaller than the lipophilic tail of such compound.

As noted, some compounds according to the present disclosure may include multiple quats. In such instances, any two or more quat moieties may be isomeric and/or stereoisomeric with respect to each other (that is, each of two or more quats may be of the general structure $R^1R^2R^3M^+$—with each R-group as described above, or each of two or more quats may be of the general structure —$R^1R^2M^+$—when incorporated into the middle of the compound). In some embodiments, any one or more quat moieties may include a different set of R-groups (e.g., a set of R-groups whose identities are only partially overlapping or entirely non-overlapping with respect to the identities of R-groups of another quat moiety). Thus, taking for example the case with entirely non-overlapping R-groups, some embodiments may comprise a first quat moiety having general structure $R^1R^2R^3M^+$—and a second quat moiety having general structure $R^4R^5R^6M^+$—, where each of $R^4$, $R^5$, and $R^6$ may have a general structure according to the principles discussed above with respect to R-groups $R^1$, $R^2$, and $R^3$.

Other suitable hydrophilic heads according to some embodiments may include any one or more of: tertiary ammonium or phosphonium cation moieties (e.g., ammonium cation moieties and/or phosphonium cation moieties of the general structures discussed above wherein one R-group is hydrogen); secondary ammonium or phosphonium cation moieties (likewise, wherein each of two R-groups are hydrogen); and/or primary ammonium or phosphonium cation moieties ($H_3N^+$— or $H_3P^+$—). In certain embodiments, a hydrophilic head need not necessarily be a cation moiety. For instance, an amine or phosphine moiety of some compounds according to various embodiments may constitute a hydrophilic head. In some embodiments, whether an amine or phosphine may be a hydrophilic head may depend at least in part upon the groups appended thereto. In some embodiments, a hydrophilic head of a cationic surfactant of the present disclosure may include any moiety that tends to be attracted to water and other polar substances.

Any two or more of the multiple hydrophilic heads may be joined indirectly by a linking group. A linking group may be any moiety suitable for linking two hydrophilic heads. In certain embodiments, the linking group may comprise any hydrocarbon chain (e.g., a $C_1$ to $C_{20}$ hydrocarbon chain. In certain embodiments, the hydrocarbon chain in the linking group may be substituted, for instance with a functional group comprising any one or more of: ether, ester, carbonyl, carboxyl, sulfonyl, sulfonic ester, carboxylic ester, hydroxyl, alkane, alkene, alkyne, and combinations thereof. In some embodiments, the substituted group may comprise a long or short-chain polymer (e.g., polyethylene oxide (PEO), and/or polypropylene oxide (PPO)). In some embodiments, the linking group may be of a length that both (i) maintains the hydrophilic nature of each hydrophilic head and (ii) provides adequate spacing between hydrophilic heads and/or lipophilic tails such that each head may distinctly interact with water or another polar substance independently of any other hydrophilic head.

In certain embodiments, the cationic surfactants according to the present disclosure comprise at least one lipophilic tail. The tail may be of sufficient length and composition to retain lipophilic and/or hydrophobic properties. By way of example, the tail of some embodiments may comprise any hydrocarbon chain (e.g., a $C_3$ to $C_{50}$ hydrocarbon chain). In certain embodiments, the length of the lipophilic tail may be tailored to particular applications and conditions in a formation. For example, in formations with larger amounts of oil, surfactants having shorter lipophilic tails may be particularly suitable. In embodiments where the lipophilic tail comprises a hydrocarbon chain, that chain may be unsubstituted or substituted, and/or branched or unbranched, and/or saturated or unsaturated. It may comprise any one or more of alkyl, alkenyl, alkynyl, and aryl groups, and/or combinations thereof. As noted, the chain may optionally be substituted with any one or more additional groups, but such substituted additional group or groups should not alter the lipophilic and/or hydrophobic nature of the tail. In certain embodiments, the cationic surfactants of the present disclosure may include exactly one lipophilic tail. In certain other embodiments, the compound may include hydrophilic heads and tails in a ratio of 2 or more hydrophilic heads for every 1 lipophilic tail. The ratio of particular embodiments may be 3 hydrophilic heads to 1 lipophilic tail. Any two or more of the multiple hydrophilic heads may be bonded via one or more linking groups.

In certain embodiments, the cationic surfactants used in the methods and systems of the present disclosure generally having the following structural formula:

wherein each of $R^1$, $R^2$, and $R^3$ may be H or any hydrocarbon chain in accordance with discussion of R-groups $R^1$, $R^2$, and $R^3$ above; M may be nitrogen or phosphorus; X may be any anion (e.g., halide, a carboxylate, a sulfate, organic sulfonate, hydroxide, and/or combinations thereof); L may be a suitable linking group (e.g., a $C_1$ to $C_{20}$ hydrocarbon chain); and T may be an amine, ammonium, phosphine, or phosphonium. Moreover, in particular embodiments, only one of $R^1$, $R^2$, and $R^3$ may be H (thereby forming a tertiary cation moiety at M). In yet other embodiments, two of $R^1$, $R^2$, and $R^3$ may be H (thereby forming a secondary cation moiety at M).

As noted, L may be a suitable linking group, including, e.g., a $C_1$ to $C_{20}$ hydrocarbon chain. In particular embodiments, L may have the following structural formula (e.g., it may be a substituted propyl chain, with substitution according to the following structure):

Z may be selected from the group consisting of: H, $R_7(CO)$—, $(CH_2CH_2O)_n$, $(CH_2CH(CH_3)O)_n$, $R_7SO_2^-$, $R_7(SO_2)O$—, $R_7$, and combinations thereof. $R_7$ may be a $C_1$ to $C_{20}$ hydrocarbon chain. Each n may be an integer ranging from 1 to 10.

Furthermore, as also noted, T may be an amine, ammonium, phosphine, or phosphonium. Thus, the cationic surfactants of the present disclosure having multiple hydrophilic heads may include or be: an aminoammonium compound (and/or a salt thereof), a phosphinophosphonium compound; an aminophosphonium compound; a phosphinoammonium compound; a multi-ammonium compound (e.g., a compound having 2 or more ammonium moieties); a multi-phosphonium compound (e.g., a compound having 2 or more phosphonium moieties); and/or any combination thereof. In particular embodiments, T may be selected from the group consisting of compounds having the following structural formula:

In such embodiments, M' is either phosphorus or nitrogen. R may be any hydrocarbon chain in accordance with discussion of lipophilic tail R above. In each structure, Q may be H or an organic group. In particular, in some embodiments Q may be a $C_1$ to $C_{20}$ hydrocarbon chain, or a $C_1$ to $C_{10}$ hydrocarbon chain, or a $C_1$ to $C_6$ hydrocarbon chain. In certain embodiments, Q may be a substituted hydrocarbon chain including an additional amine, ammonium, phosphine, or phosphonium moiety, such as an alkyl, alkenyl, alkynyl, or aryl amine, or an alkyl, alkenyl, alkynyl, or aryl phosphine; or an alkyl, alkenyl, alkynyl, or aryl ammonium moiety, or an alkyl, alkenyl, alkynyl, or aryl phosphonium moiety, or combinations thereof. For instance, Q may have the structure:

where L' may independently be any structure that L may be, as discussed above; M" may be nitrogen or phosphorus; X' may independently be any anion that X may be, as discussed above; and each of $R^4$, $R^5$, and $R^6$ may independently be H or any hydrocarbon chain according to $R^1$, $R^2$, and $R^3$ discussed above. In particular embodiments, the cationic surfactant may be symmetrical about the central amine or phosphine (or, where applicable—such as in the case of salts—around the central ammonium or phosphonium moiety). In such instances, L' is the same as L, and each of $R^4$, $R^5$, and $R^6$ is identical to each of $R^1$, $R^2$, and $R^3$, respectively. In various embodiments, any one or more of the foregoing R-groups $R^1$ through $R^6$ may be unsubstituted. Likewise, in some embodiments, R may be unsubstituted.

Methods of Synthesizing Cationic Surfactants

The cationic surfactants according to some embodiments of the present disclosure may instead or in addition be characterized and/or provided as reaction products. For example, the present disclosure in some embodiments provides a compound that may be characterized as the reaction product of: (1) the reaction product of a long-chain primary amine and an epihalohydrin; and (2) a tertiary amine. Put another way, compounds of such embodiments may be characterized as the product of a two-step reaction: (1) R—$NH_2$+2[epihalohydrin]; and (2) [product of reaction (1)]+$R^1R^2R^3N$. Each reaction step may be carried out at approximately room temperature (e.g., about 20° C. to about 24° C.). In some embodiments, each reaction step may be carried out at any temperature ranging from about 20 to about 80° C. at approximately atmospheric pressure. The epihalohydrin may comprise epichlorohydrin, epibromohydrin, epifluorohydrin, epiiodohydrin, and combinations thereof.

In this scheme, the resultant product may include organic moiety R of the long-chain primary amine as lipophilic tail R; thus, the possible identities of organic moiety R may be the same as previously discussed with respect to lipophilic tail R (notwithstanding the moniker "long-chain," which is not intended to imply that a particular structure of R is required in any embodiment, other than as discussed previously with respect to lipophilic tail R as seen in various embodiments). Specific examples of suitable long-chain primary amine include cocoamine, tallow amine, oleyl amine, stearyl amine, lauryl amine, combinations of any two or more of the foregoing, and other long-chain primary amines having organic moiety R with characteristics in accordance with the lipophilic tail R discussed above (as well as combinations thereof). Similarly, R-groups $R^1$, $R^2$, and $R^3$ of the tertiary amine (and/or phosphine) may be in accordance with those R-groups previously discussed with respect to quaternary cations. In yet further embodiments, however, a secondary amine may be used instead of or in addition to tertiary amine in the second reaction step. In such instances, one of R-groups $R^1$, $R^2$, and $R^3$ is H, and the resultant product may still include multiple quaternary ammonium cations, although it may instead include multiple tertiary ammonium cations, and/or a mixture of tertiary and quaternary ammonium cations. Specific examples of suitable secondary and/or tertiary amine $R^1R^2R^3N$ for use in the second step of reaction may therefore include dimethylcocoamine, triethylamine, tripropylamine, tributylamine, tripentylamine, N,N-dimethylaniline, N,N-diethylaniline, dimethylisopropaneamine, dimethylbutylamine, dipropylamine, and combinations thereof. The ultimate reaction product may accordingly include multiple quat moieties (and/or tertiary ammonium cation moieties to the extent secondary amines are used in reaction), each having general structure $R^1R^2R^3N$—(where each of $R^1$, $R^2$, and $R^3$ may be an R-group in accordance with those discussed previously, and/or one of $R^1$, $R^2$, and $R^3$ may be H).

Particular embodiments may provide the reaction product of a synthesis method according to the foregoing, except using (i) a long-tail primary phosphine in place of the long-tail primary amine, and (ii) a secondary or tertiary phosphine in place of the secondary or tertiary amine. And in yet other embodiments, a combination of long-tail primary phosphine and long-tail primary amine may be used in the first reaction step, and a combination of (i) secondary or tertiary phosphine and (ii) secondary or tertiary amine may be used in the second reaction step.

Figure 2:
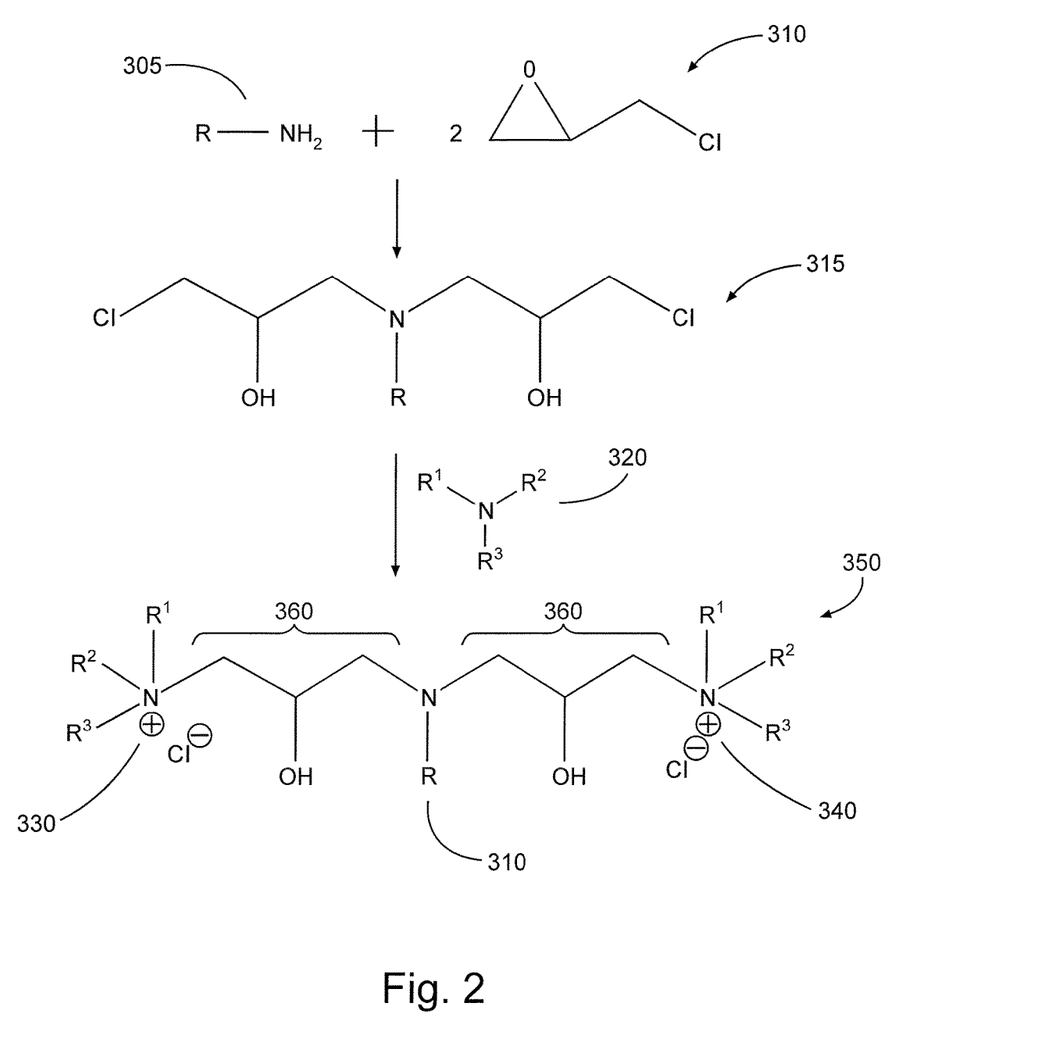
FIG. 2 is a symbolic representation of a chemical reaction that may be used to synthesize cationic surfactants according to certain embodiments of the present disclosure.

FIG. 2 illustrates an example process of synthesizing one embodiment of a cationic surfactant of the present disclosure. Referring now to FIG. 2, 1 mole of primary amine 305 reacts with 2 moles epihalohydrin 310 (shown in FIG. 2 as epichlorohydrin). The product 315 of this reaction is then in turn reacted with tertiary amine 320 (as noted previously, this could be replaced by any of: secondary amine, secondary phosphine, tertiary amine, tertiary phosphine, and combinations thereof), yielding a compound 350 comprising multiple hydrophilic heads (330, 340) that may be used as a surfactant of the present disclosure. As shown in FIG. 2, the cation moieties 330 and 340 of the compound 350 are each associated (e.g., ionically bonded or otherwise associated) with chloride ions, making the compound 350 a quaternary ammonium salt. Such salts may wholly or partially dissociate in aqueous or oligeous solution and/or solvents, and/or such salts may associate with different anions. It will further be appreciated by one of ordinary skill in the art with the benefit of this disclosure that salts may initially be formed with other anions instead of or in addition to chloride anions. For instance, suitable anions may comprise any one or more of hydroxide, carboxylate, halide, sulfate, organic sulfonate, and combinations thereof. Accordingly, when a compound comprising cation moieties is referred to herein, it should be understood that such reference may alternately include both the salt form and the dissociated form (that is, having at least one cation moiety not associated with an anion) of the compound, unless specifically noted otherwise.

In the example embodiment of a salt of a cationic surfactant of the present disclosure shown in FIG. 2, compound 350 includes two quat moieties 330 and 340 located at end-points of the molecule—that is, each quat moiety is bonded at only one location to the remainder of the compound. In some embodiments, a quat moiety may be included in the middle of a compound. In such embodiments, a quat moiety may have the general structure —$R^1R^2M^+$—, and the remaining moieties of the compound are bonded at each of two locations to this general structure. Compound 350 also includes linking groups 360, each of which is a hydroxypropyl moiety linking, respectively, hydrophilic heads 330 and 340 to a lipophilic tail 370.

Scale Inhibitor Squeeze Treatments and Fluids

Figure 1A:
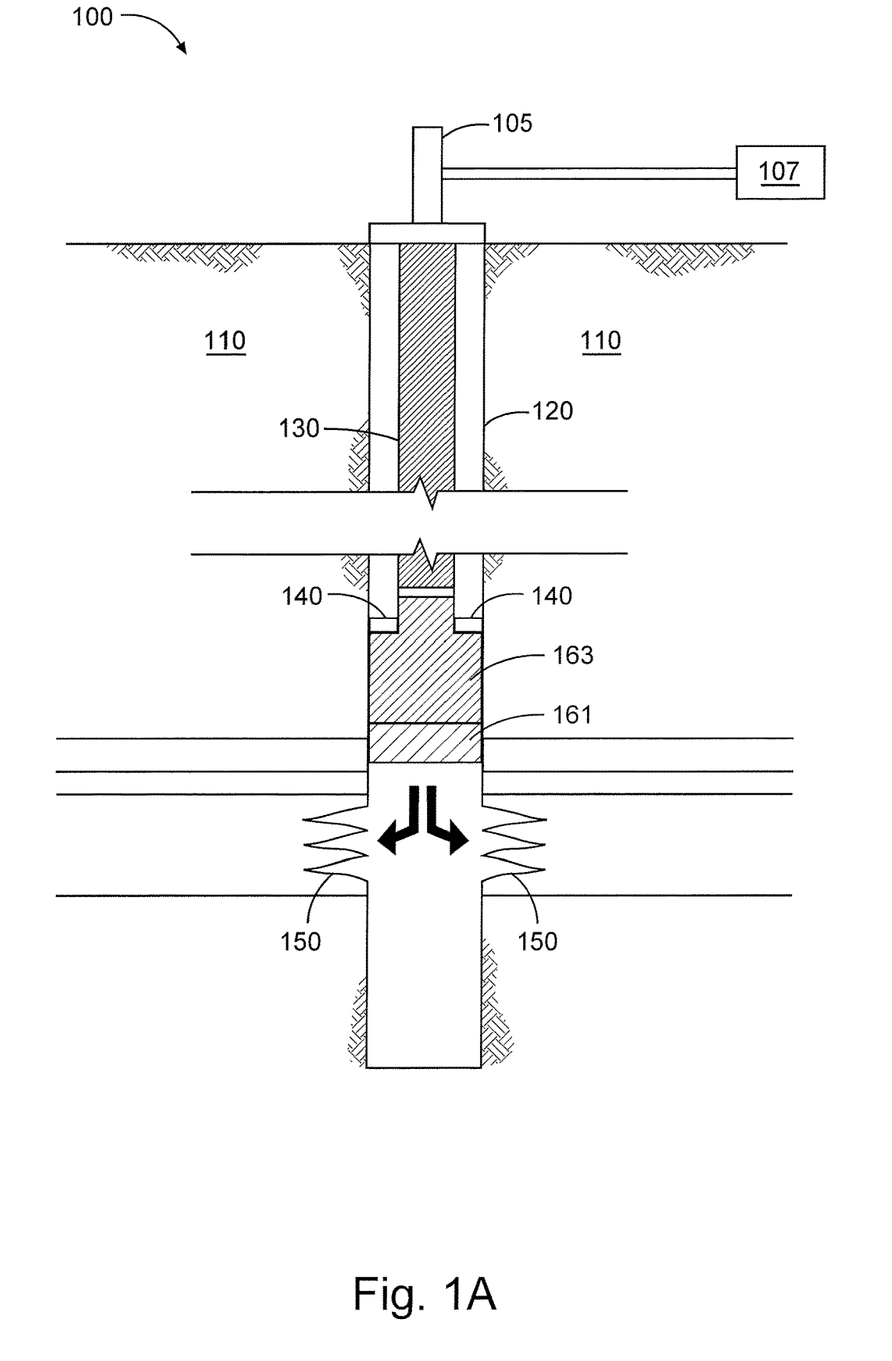
FIGS. 1A and 1B are diagrams illustrating a scale inhibitor squeeze treatment according to certain embodiments of the present disclosure.
Figure 1B:
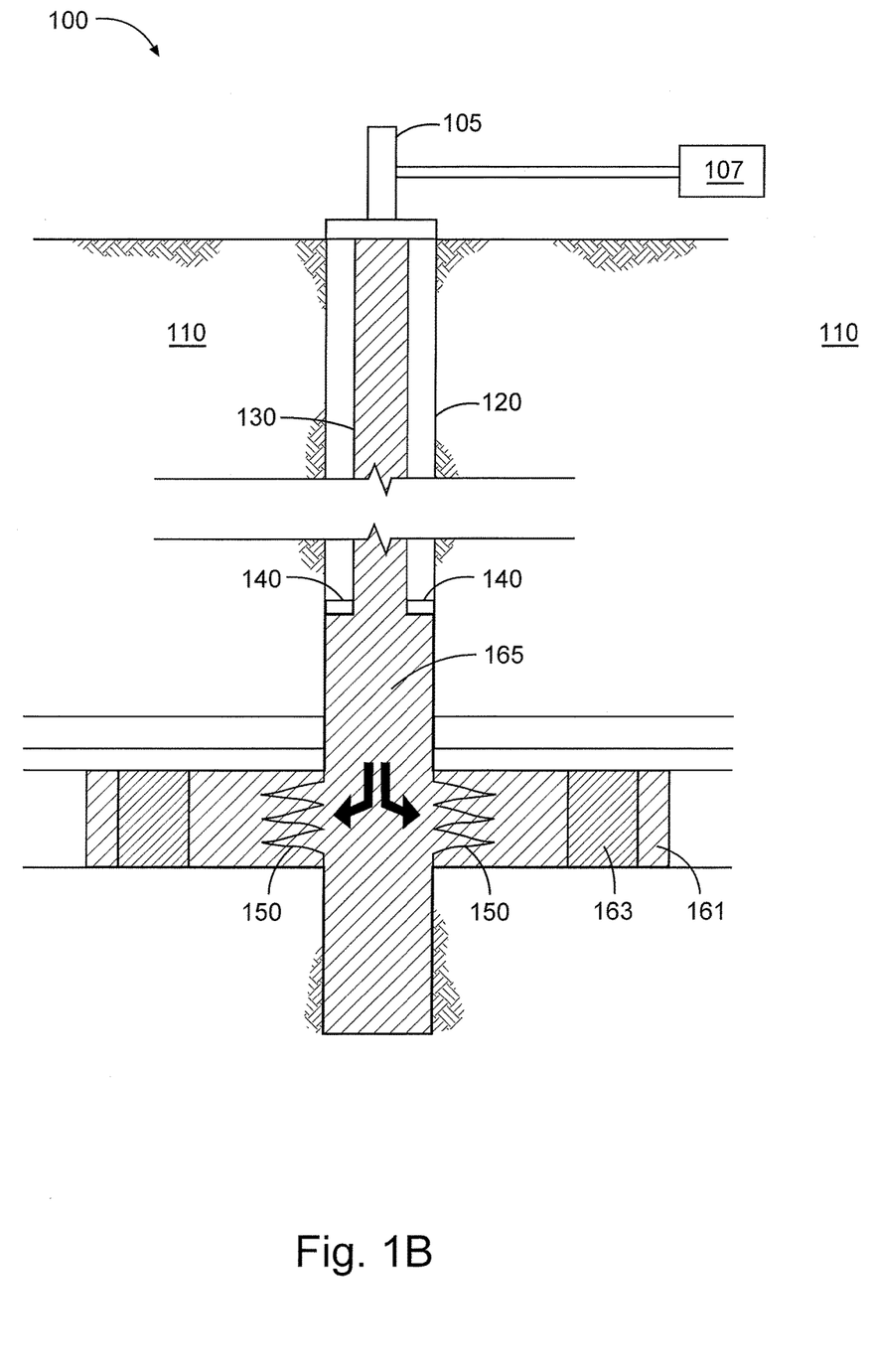

As discussed above, the present disclosure provides certain methods of treating a subterranean formation with one or more scale inhibitors, for example, in a squeeze scale inhibitor treatment. An example of one such method is illustrated in FIGS. 1A and 1B. Referring now to FIG. 1A, a well site 100 is shown at which a well bore 120 has been drilled to penetrate a portion of subterranean formation 110. The well bore 120 may comprise an open hole, or it may include one or more casing strings (not shown) disposed therein. A wellhead 105 is installed at the top of the well bore 120 to which treating equipment 107 is coupled. The treating equipment 107 may include pumps, fluid sources, blenders, liquid additive pumps, solid additive hoppers, and/or other equipment used to prepare and/or inject fluids and additives into the well bore 120. For example treating equipment 107 may comprise a pump and blender system designed to mix the pre-flush fluids, treatment fluids, and/or afterflush fluids of the present disclosure. A string of production tubing 130 is disposed in the well bore and extends from the well head down to approximately the depth of a hydrocarbon-bearing portion of the formation 110, and is held in place by a packer 140. One or more perforations 150 in the well bore wall or casing also provide fluid communication between the hydrocarbon-bearing portion of the formation 110 and the production tubing 130.

In the squeeze treatments of the present disclosure, a pre-flush fluid 161 of the present disclosure comprising one or more cationic surfactants is injected into the production tubing 130 using one or more pumps in the treating equipment 107. This pre-flush fluid also may be used to clean debris or other substances out of the producing area of the well bore 120 and formation 110 either by mechanically displacing them from that region or by chemical treatment (e.g., acid dissolution). In certain embodiments, additional pre-flush fluids, cleaning fluids, etc. (not shown) may be injected into the well bore prior to pre-flush fluid 161. Next, a treatment fluid 163 of the present disclosure comprising a scale inhibitor is injected into the production tubing 130 using one or more pumps in the treating equipment 107. In certain embodiments, the treatment fluid 163 also may be preceded by additional fluids (not shown), such as spacer fluids used to separate treatment fluid 163 from pre-flush fluid 161, or another pre-flush/treatment fluid that comprises a smaller concentration of the scale inhibitor (as compared to treatment fluid 163) that may be used to prepare the formation to adsorb the scale inhibitor in treatment fluid 163.

Referring now to FIG. 1B, a later stage of the squeeze treatment from FIG. 1A is shown at the same well site 100. Following the injection of the treatment fluid 163 (and, optionally, additional spacer fluids), an afterflush/displacement fluid 165 is injected into the production tubing 130 using one or more pumps in the treating equipment 107. As shown, fluid 165 displaces the pre-flush fluid 161 and treatment fluid 163 through the perforations 150 and into the near well bore area of the formation 110. This allows the cationic surfactant in fluid 161 to prepare the formation 110 for adsorption of the scale inhibitor that then enters the formation 110 in fluid 163.

Following the complete injection of fluid 165, the well bore 120 may be shut in for a period of time in order to allow the scale inhibitor to soak in and adsorb onto the rock surfaces in formation 110. This period of shut-in time may vary from a few hours to several days, depending on a number of factors that a person of skill in the art will recognize with the benefit of this disclosure, such as the size and/or depth of the well bore, temperature and/or pressure conditions in the formation, the composition of the formation, the types and amounts of surfactants and/or scale inhibitors used, and other similar factors. In certain embodiments, the shut-in time may be from approximately 1 hour to about 8 hours. In certain embodiments, the well bore 120 may be shut in for approximately 4 hours. In certain embodiments, the pH in the portion of the subterranean formation is from about 4 to about 8

Following that shut-in time, the well bore 120 may be brought into production during which fluids from the formation 110 are permitted to flow out of the well bore 120 to the surface via production tubing. As that occurs, the produced fluids may carry some amount of the adsorbed scale inhibitor through the perforations 150 and production tubing 130. In certain embodiments, this may prevent or reduce the formation of scales in those areas. In certain embodiments, additional tools, tubulars, valves, and/or other equipment (not shown) may be disposed along the production tubing 130. The flow of the produced fluid carrying the scale inhibitor may prevent or reduce the formation of scales in that equipment as well. In some instances, the concentration of scale inhibitor in the fluids flowing out of the well bore may be monitored during production to confirm that they are sufficient to control scale formation at that well. If the concentration of the scale inhibitor falls below a certain threshold amount, it may be determined that additional treatments (e.g., additional scale inhibitor squeeze treatments) will be performed.

The pre-flush fluids, treatment fluids, and/or afterflush fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, whether that fluid is being used to enhance adsorption, desorption, precipitation, or dissolution of the scale inhibitor. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, alcohols, organic liquids/solvents, and the like. In certain embodiments, the fracturing fluids may comprise a mixture of one or more fluids and/or gases, including but not limited to emulsions, foams, and the like.

The cationic surfactants of the present disclosure may be included in the pre-flush fluid(s) in any amount or concentration suitable for a particular operation. In certain embodiments, the cationic surfactant may be included in the pre-flush fluid in a concentration of from about 0.01% to about 5% by volume of the fluid. In certain embodiments, the cationic surfactant may be included in the pre-flush fluid in a concentration of less than about 0.5% by volume of the fluid. In certain embodiments, the cationic surfactant may be included in the pre-flush fluid in a concentration of about 0.5% by volume of the fluid. A person of ordinary skill in the art, with the benefit of this disclosure, will be able to select an appropriate concentration of the cationic surfactant based on a number of factors, including but not limited to the type, size, and/or rock composition of the subterranean formation, the amount of scale inhibitor to be used, the conditions in the formation, the frequency of treatments to be applied in the formation, and the expected producing life of the well.

The scale inhibitors used in the methods and systems of the present disclosure may comprise any anionic scale inhibitors (or combination thereof) known in the art. In certain embodiments, the scale inhibitors may be polymeric. Examples of anionic scale inhibitors that may be suitable for use in certain embodiments of the present disclosure include, but are not limited to phosphonic acids, phosphoric acids, phosphorous acid, phosphate esters, phosphonates, various aminopolycarboxylic acids, salts thereof, and any combinations thereof. Examples of anionic polymeric scale inhibitors that may be suitable for use in certain embodiments of the present disclosure include, but are not limited to polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), salts thereof, and any combinations thereof. The scale inhibitor may be included in a treatment fluid in any amount or concentration suitable for a particular operation. In certain embodiments, the scale inhibitor may be included in the treatment fluid in a concentration of from about 1% to about 30% by volume of the fluid. In certain embodiments, the scale inhibitor may be included in the treatment fluid in a concentration of from about 5% to about 20% by volume of the fluid. In certain embodiments, the scale inhibitor may be included in the treatment fluid in a concentration of less than about 10% by volume of the fluid. In some embodiments, a smaller concentration of the scale inhibitor also may be included in one or more fluids (e.g., pre-flush fluids) introduced into the formation before the main treatment fluid but after the pre-flush fluid comprising the cationic surfactant.

In certain embodiments, the pre-flush fluids, treatment fluids, and/or afterflush fluids used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

A series of tests were performed to confirm that the addition of a cationic surfactant could enhance the performance of a scale inhibitor in squeeze treatments. In the examples below, the cationic surfactant comprised a compound having a molecular structure according to that of compound 350 shown in FIG. 2, and the polymeric scale inhibitor comprised polyphosphinocarboxylate (PPCA).

Example 1

A 1% aqueous solution of the polymeric scale inhibitor was mixed with a 0.4% aqueous solution of the cationic surfactant shown in FIG. 2 (both in 2% solution of NaCl). Once mixed, the solution turned hazy immediately, indicating the formation of a precipitate. However, the haze disappeared and the mixed solution became clear when its pH was lowered to less than 2.

Example 2

Samples of the cationic surfactant and polymeric scale inhibitor from Example 1 were sequentially added to a beaker without any aging time containing synthetic seawater (a dilute calcium carbonate brine) and Ottawa sand, and then incubated at 150° F. at pH 5 and 7, respectively. Control samples without the surfactant were prepared and tested in the same manner at the same pH levels. After four hours, the mass of polymeric scale inhibitor adsorbed onto the sand was measured for each sample. The results are shown in Table 1 below.

TABLE 1

|  | pH = 5 | pH = 7 |
|---|---|---|
| Mass of scale inhibitor with surfactant treatment (mg) | 9.58 | 2.35 |
| (Control) Mass of scale inhibitor without surfactant treatment (mg) | 0.25 | 0.25 |

This example demonstrated that the cationic surfactant increased the amount of scale inhibitor adsorbed onto the sand surface by 38 times at pH=5 and by more than 9 times at pH=7.

Example 3

Figure 3:
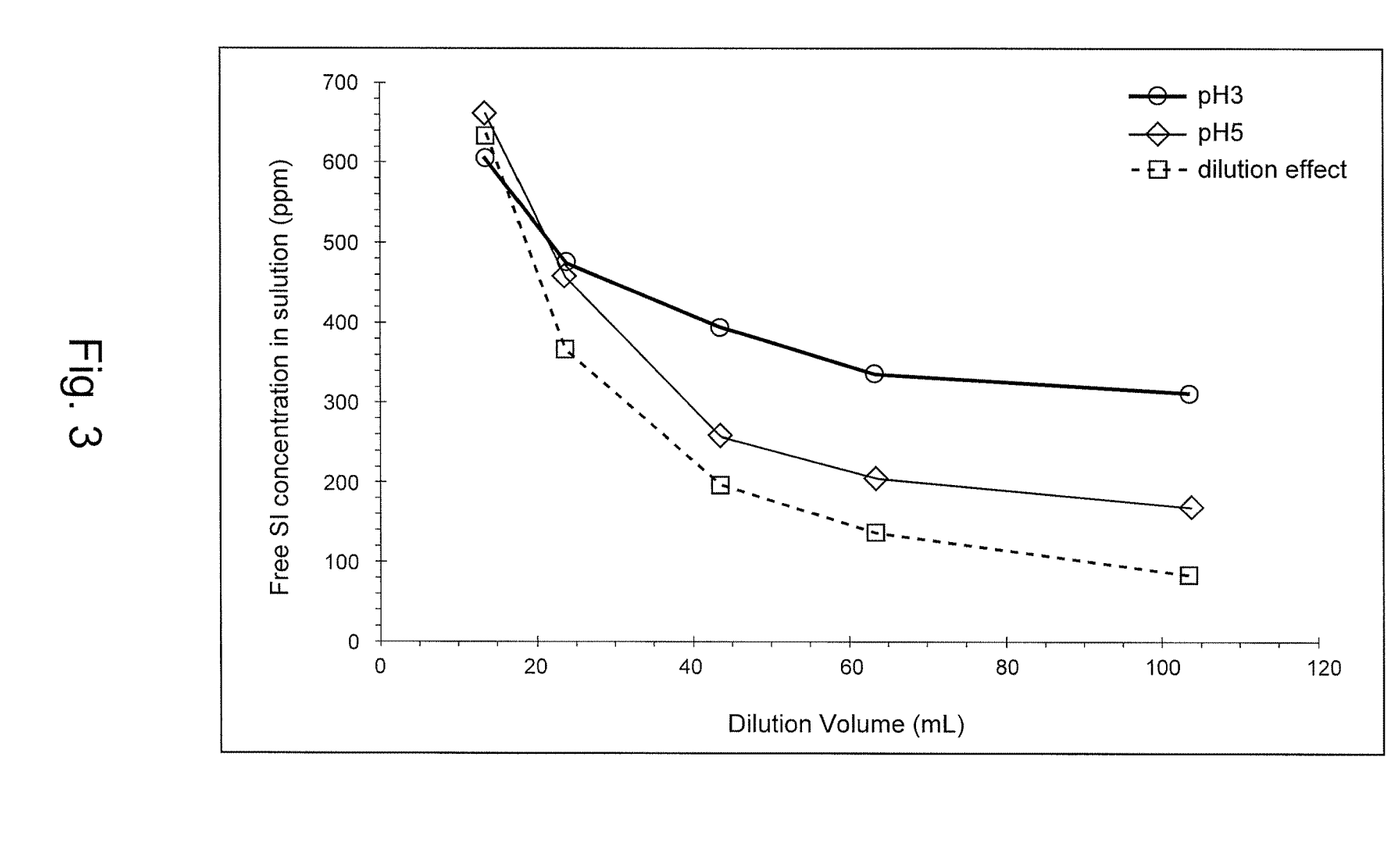
FIG. 3 is a graph illustrating data from desorption tests of certain methods of the present disclosure.

The sand samples from Example 2 that were treated with the surfactant and scale inhibitor at pH=5 and pH=7 were washed with water at pH 3 and 5, respectively, to measure the desorption of the scale inhibitor back into solution. The free concentration of scale inhibitor in the effluent was recorded with the accumulated volume of water, and those data are plotted in FIG. 3. The scale inhibitor in the effluent was contributed from two sources: (1) the dissolution from the previously adsorbed scale inhibitor, and (2) the leftover liquid during the adsorption treatment stages that represented a dilution effect. The concentration of scale inhibitor from the latter source was calculated as a function of dilution volume, and is plotted in the dotted line in FIG. 3. Thus, the additional concentrations above that dotted line indicate the amounts of scale inhibitor that were desorbed from the treated sand. This test demonstrated that the scale inhibitor can be released back into solution following adsorption enhanced using a method of the present disclosure, and that the scale inhibitor was released faster at lower pH levels.

Example 4

Figure 4A:
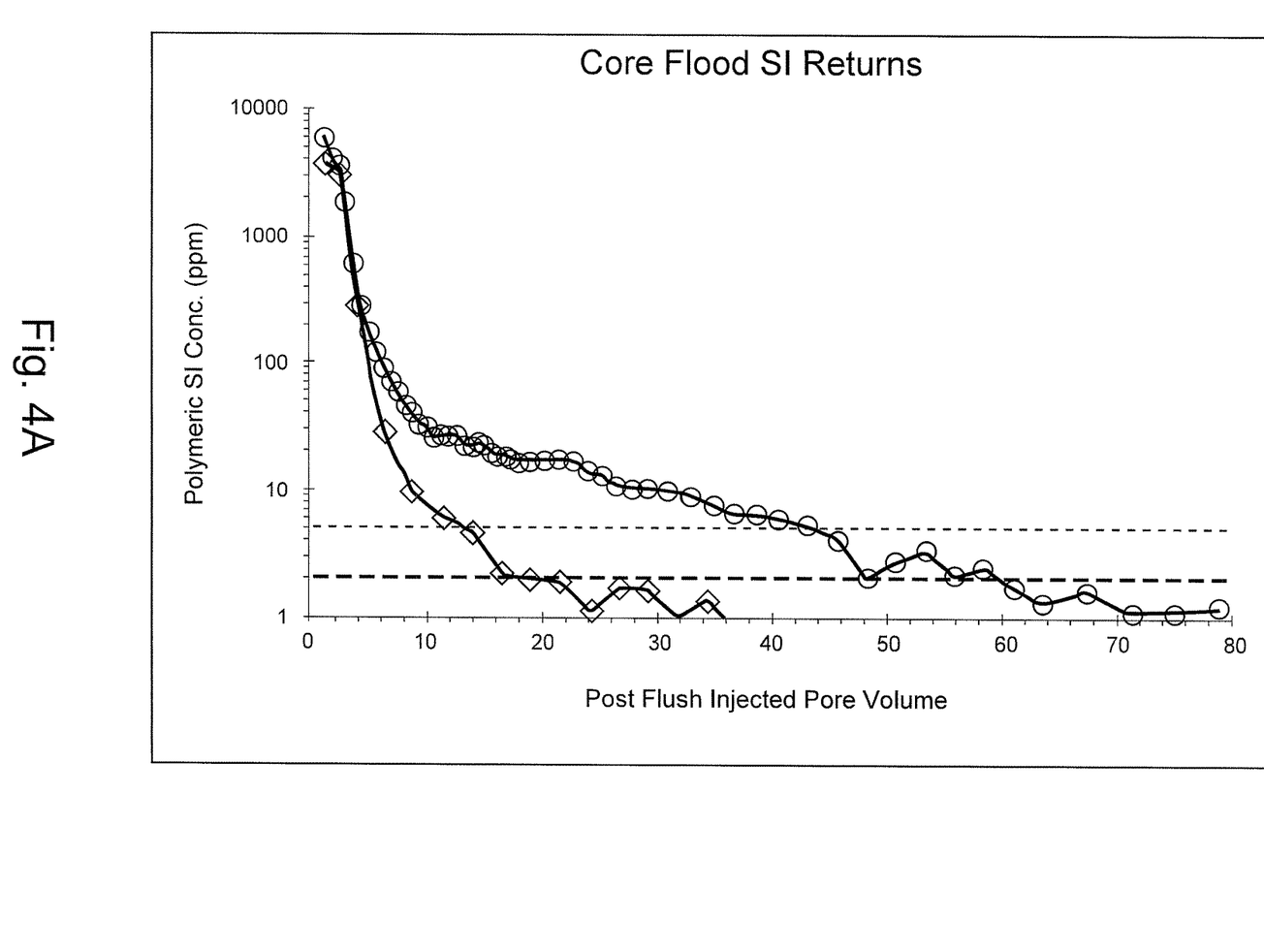
FIG. 4A is a graph on a logarithmic scale illustrating data from coreflood tests of certain methods of the present disclosure.
Figure 4B:
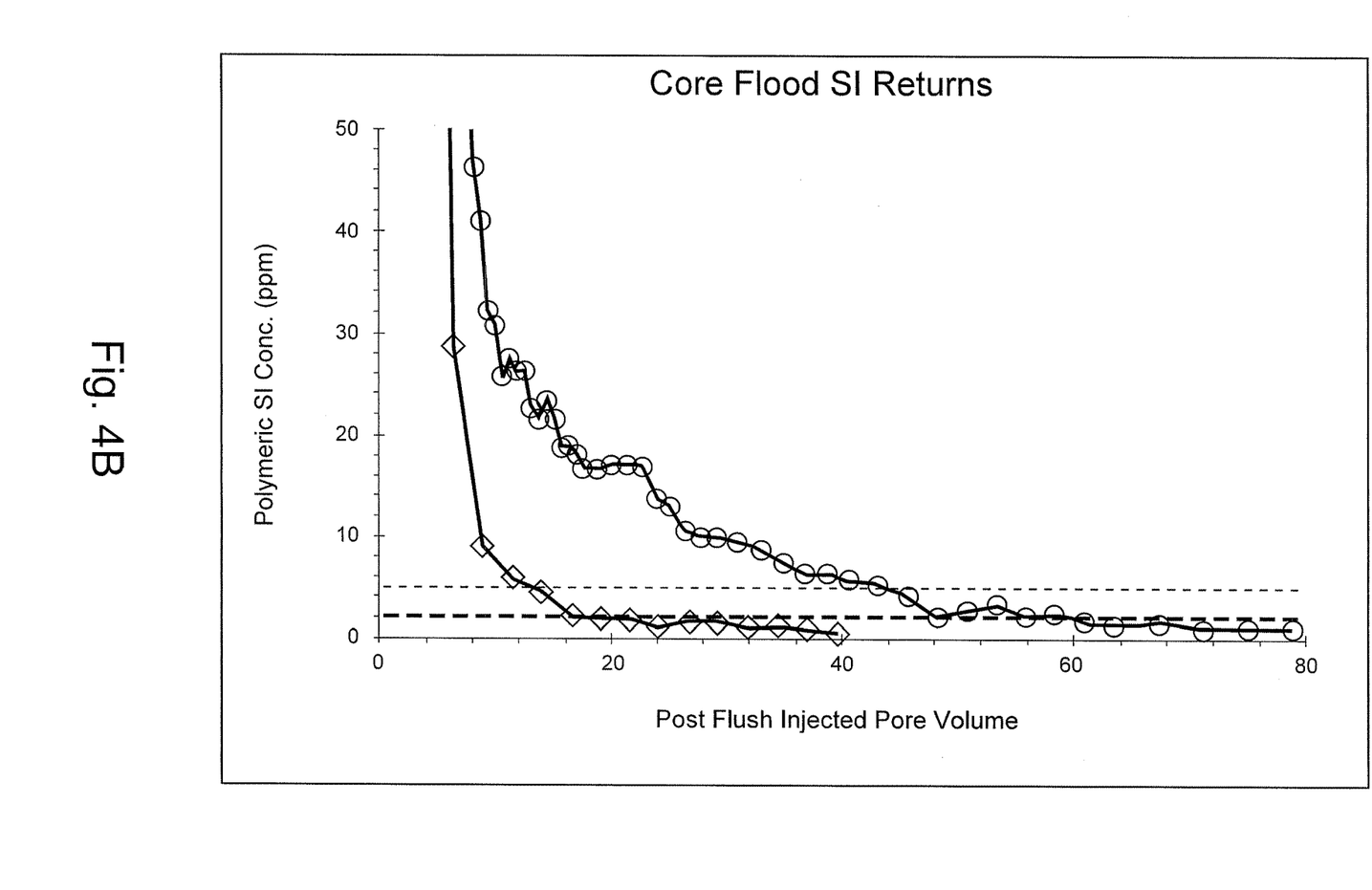
FIG. 4B is a graph on a linear scale illustrating a portion of the data shown in FIG. 4A.

Coreflood tests were performed on a test and control "core" using columns packed with Ottawa sand. A solution of the cationic surfactant from Example 1 (or, for the control test, synthetic seawater) followed by a solution of the scale inhibitor from Example 1 was pumped through each of the columns. The cores were shut in for 4 hours and then post-flushed with several pore volumes of synthetic seawater. The concentrations of scale inhibitor were measured as a function of volumes of the post-flush, and those data are plotted in FIG. 4A (entire y-axis range on a logarithmic scale) and 4B (limited portion of y-axis on normal scale). The dotted horizontal lines represent minimum concentration levels of 5 ppm (for a brine with high scale tendency) and 2 ppm (for a brine with less scale tendency). As shown, it took more than 45 pore volumes of post flush seawater to reduce the scale inhibitor concentration below 5 ppm in the surfactant-treated core (as compared to 14 pore volumes for the control core), and more than 60 pore volumes to reduce the scale inhibitor concentration below 2 ppm in the surfactant-treated core (as compared to 18 pore volumes in the control core). These data suggest that, in certain embodiments, the methods and systems of the present disclosure may be able to extend the effective life of certain scale inhibitor squeeze treatments by more than 3 times as compared to corresponding conventional treatments.

An embodiment of the present disclosure is a method comprising: introducing a pre-flush fluid into at least a portion of a subterranean formation, the pre-flush fluid comprising a cationic surfactant having the following structural formula:

wherein each of $R^1$, $R^2$, and $R^3$ is independently selected from the group consisting of: hydrogen, a $C_1$ to $C_{12}$ hydrocarbon chain, and any combination thereof; wherein M is selected from the group consisting of nitrogen, phosphorous, and any combination thereof; wherein X is an anion selected from the group consisting of a halide, a carboxylate, a sulfate, an organic sulfonate, a hydroxide, and any combination thereof; wherein L comprises a $C_1$ to $C_{20}$ hydrocarbon chain; and wherein T is selected from the group consisting of compounds having the following structural formula:

wherein R comprises a $C_1$ to $C_{20}$ hydrocarbon chain; wherein M' is selected from the group consisting of nitrogen, phosphorous, and any combination thereof; and wherein Q comprises at least one functional group selected from the group consisting of: a hydrogen atom, an unsubstituted $C_1$ to $C_{20}$ hydrocarbon chain, a substituted $C_1$ to $C_{20}$ hydrocarbon chain, and any combination thereof; and introducing a treatment fluid comprising anionic scale inhibitor into the portion of the subterranean formation after at least a portion of the pre-flush fluid has been introduced into the portion of the subterranean formation.

Another embodiment of the present disclosure is a system comprising: introducing a pre-flush fluid into at least a portion of a subterranean formation, the pre-flush fluid comprising a cationic surfactant comprising two or more hydrophilic heads, at least one lipophilic tail, and one or more linking groups to which the hydrophilic heads and the lipophilic tail are bonded; and introducing a treatment fluid comprising anionic scale inhibitor into the portion of the subterranean formation after at least a portion of the pre-flush fluid has been introduced into the portion of the subterranean formation.

Another embodiment of the present disclosure is a method comprising: (a) injecting a pre-flush fluid into a well bore penetrating at least a portion of a subterranean formation, the pre-flush fluid comprising a cationic surfactant comprising two or more hydrophilic heads, at least one lipophilic tail, and one or more linking groups to which the hydrophilic heads and the lipophilic tail are bonded; (b) injecting a treatment fluid comprising anionic scale inhibitor into the well bore after the pre-flush fluid has been injected; and (c) injecting an after-flush fluid into the well bore after the treatment fluid comprising the anionic scale inhibitor has been introduced into the well bore to displace the pre-flush fluid and the treatment fluid into at least a near well bore area of the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
introducing a pre-flush fluid into at least a portion of a subterranean formation, the pre-flush fluid comprising a cationic surfactant having the following structural formula:

wherein each of $R^1$, $R^2$, and $R^3$ is independently selected from the group consisting of: hydrogen, a $C_1$ to $C_{12}$ hydrocarbon chain, and any combination thereof;
wherein M is selected from the group consisting of nitrogen, phosphorous, and any combination thereof;
wherein X is an anion selected from the group consisting of a halide, a carboxylate, a sulfate, an organic sulfonate, a hydroxide, and any combination thereof;

wherein L comprises a $C_1$ to $C_{20}$ hydrocarbon chain; and
wherein T is selected from the group consisting of compounds having the following structural formula:

wherein R comprises a $C_1$ to $C_{20}$ hydrocarbon chain;
wherein M' is selected from the group consisting of nitrogen, phosphorous, and any combination thereof; and
wherein Q is selected from the group consisting of: a hydrogen atom, an unsubstituted $C_1$ to $C_{20}$ hydrocarbon chain, and any combination thereof; and
introducing a treatment fluid comprising an anionic scale inhibitor into the portion of the subterranean formation after at least a portion of the pre-flush fluid has been introduced into the portion of the subterranean formation.

2. The method of claim 1 further comprising allowing at least a portion of the anionic scale inhibitor to adsorb onto a rock surface in at least a portion of the subterranean formation.

3. The method of claim 1 further comprising introducing an after-flush fluid into the portion of the subterranean formation after at least a portion of the anionic scale inhibitor has been introduced into the portion of the subterranean formation.

4. The method of claim 3 further comprising:
shutting in the well bore for a predetermined period of time; and
allowing produced fluids in the subterranean formation to flow from the formation and through the well bore after the shut-in period of time has ended.

5. The method of claim 1 wherein the anionic scale inhibitor comprises at least one component selected from the group consisting of: a phosphonic acid, a phosphoric acid, a phosphorous acid, a phosphate ester, a phosphonate, an aminopolycarboxylic acid, any salt thereof, and any combination thereof.

6. The method of claim 1 wherein the anionic scale inhibitor comprises a polymeric scale inhibitor selected from the group consisting of: a polyacrylamide, a salt of an acrylamido-methyl propane sulfonate/acrylic acid copolymer, a phosphinated maleic copolymer, a salt of a polymaleic acid/acrylic acid/acrylamido-methyl propane sulfonate terpolymer, and any combination thereof.

7. The method of claim 1 wherein the pre-flush fluid further comprises an anionic scale inhibitor in an amount smaller than the amount of the anionic scale inhibitor in the treatment fluid.

8. The method of claim 1 wherein the cationic surfactant is present in the pre-flush fluid in an amount of from about 0.01% to about 5% by volume of the fluid.

9. The method of claim 1 wherein the anionic scale inhibitor is present in the treatment fluid in an amount of less than about 10% by volume of the fluid.

10. The method of claim 1 wherein the pH in the portion of the subterranean formation is from about 4 to about 8.

11. A method comprising:
introducing a pre-flush fluid into at least a portion of a subterranean formation, the pre-flush fluid comprising a cationic surfactant comprising two or more hydrophilic heads, at least one lipophilic tail, and one or more linking groups to which the hydrophilic heads and the lipophilic tail are bonded, wherein the cationic surfactant comprises the reaction product of a reaction process that comprises (i) a first reaction between a long-chain primary amine and an epihalohydrin, and (ii) a second reaction between the product of the first reaction with a secondary or tertiary amine; and
introducing a treatment fluid comprising an anionic scale inhibitor into the portion of the subterranean formation after at least a portion of the pre-flush fluid has been introduced into the portion of the subterranean formation.

12. The method of claim 11 wherein the cationic surfactant comprises at least one surfactant having the following structural formula:

wherein each of R, $R^1$, $R^2$, and $R^3$ comprises an organic moiety selected from the group consisting of: an alkyl group, an alkenyl group, an alkynyl group, an aryl group, an arylalkyl group, an arylalkenyl group, an alkylaryl group, an alkenylaryl group, a glycol, and any combination thereof.

13. The method of claim 11 further comprising allowing at least a portion of the anionic scale inhibitor to adsorb onto a rock surface in at least a portion of the subterranean formation.

14. The method of claim 11 further comprising introducing an after-flush fluid into the portion of the subterranean formation after at least a portion of the anionic scale inhibitor has been introduced into the portion of the subterranean formation.

15. The method of claim 11 wherein the pre-flush fluid further comprises an anionic scale inhibitor in an amount smaller than the amount of the anionic scale inhibitor in the treatment fluid.

16. A method comprising:
(a) injecting a pre-flush fluid into a well bore penetrating at least a portion of a subterranean formation, the pre-flush fluid comprising a cationic surfactant having the following structural formula:

wherein each of $R^1$, $R^2$, and $R^3$ is independently selected from the group consisting of: hydrogen, a $C_1$ to $C_{12}$ hydrocarbon chain, and combinations thereof;
wherein M is selected from the group consisting of nitrogen and phosphorous;
wherein X is an anion selected from the group consisting of halide, carboxylate, sulfate, organic sulfonate, hydroxide, and combinations thereof;
wherein T is selected from the group consisting of compounds having the following structural formulas:

wherein R is a $C_1$ to $C_{20}$ hydrocarbon chain;
wherein J is selected from the group consisting of hydrogen, a $C_1$ to $C_6$ hydrocarbon chain, and combinations thereof;
wherein X" is an anion selected from the group consisting of halide, carboxylate, sulfate, organic sulfonate, hydroxide, and combinations thereof;
wherein M' is selected from the group consisting of nitrogen and phosphorous; and
wherein Q has the structural formula:

wherein L' is a $C_1$ to $C_{20}$ hydrocarbon chain;
wherein M" is selected from the group consisting of nitrogen and phosphorous;
wherein X' is an anion selected from the group consisting of halide, carboxylate, sulfate, organic sulfonate, hydroxide, and combinations thereof;
wherein each of $R^4$, $R^5$, and $R^6$ is independently selected from the group consisting of: hydrogen, a $C_1$ to $C_{12}$ hydrocarbon chain, and combinations thereof; and
wherein each of L and L' independently has the structural formula:

wherein Z of each of L and L' is independently selected from the group consisting of: hydrogen, $R^7(CO)—$, $(CH_2CH_2O)_n$, $(CH_2CH(CH_3)O)_n$, $R^7SO_2—$, $R^7(SO_2)O—$, $R^7$, and combinations thereof; wherein $R^7$ is a $C_1$ to $C_{20}$ hydrocarbon chain; and further wherein n ranges from 1 to 10;

(b) injecting a treatment fluid comprising an anionic scale inhibitor into the well bore after the pre-flush fluid has been injected; and

(c) injecting an after-flush fluid into the well bore after the treatment fluid comprising the anionic scale inhibitor has been introduced into the well bore to displace the pre-flush fluid and the treatment fluid into at least a near well bore area of the subterranean formation.

17. The method of claim 16 further comprising allowing at least a portion of the anionic scale inhibitor to adsorb onto a rock surface in at least a portion of the subterranean formation.

18. The method of claim 16 further comprising:
shutting in the well bore for a predetermined period of time; and
allowing produced fluids in the subterranean formation to flow from the formation and through the well bore after the shut-in period of time has ended.

19. The method of claim 16 wherein one or more of the pre-flush fluid, the treatment fluid, and the after-flush fluid are injected into the well bore using one or more pumps.

20. The method of claim 16 wherein the cationic surfactant comprises at least one surfactant having the following structural formula:

wherein each of R, $R^1$, $R^2$, and $R^3$ comprises an organic moiety selected from the group consisting of: an alkyl group, an alkenyl group, an alkynyl group, an aryl group, an arylalkyl group, an arylalkenyl group, an alkylaryl group, an alkenylaryl group, a glycol, and any combination thereof.

* * * * *